US006378817B1

(12) United States Patent
Bublitz et al.

(10) Patent No.: US 6,378,817 B1
(45) Date of Patent: Apr. 30, 2002

(54) KIT AND METHOD FOR MOUNTING A TRANSMITTER IN SUBSURFACE METER PITS

(75) Inventors: Eric Bublitz, Franklin; Mark Lazar, New Berlin, both of WI (US)

(73) Assignee: Badger Meter, Inc., Milwaukee, MI (US)

( * ) Notice: Subject to any disclaimer, the term of this patent is extended or adjusted under 35 U.S.C. 154(b) by 0 days.

(21) Appl. No.: 09/566,214

(22) Filed: May 5, 2000

(51) Int. Cl.[7] ............................................ F16M 11/00
(52) U.S. Cl. ................ 248/200; 248/354.6; 340/870.02
(58) Field of Search ................................ 248/200, 343, 248/344, 354.3, 354.4, 354.5, 354.6; 340/870.02, 870.31, 870.01

(56) References Cited

U.S. PATENT DOCUMENTS

| | | | | |
|---|---|---|---|---|
| 5,298,894 A | | 3/1994 | Cerny et al. | |
| 5,416,475 A | | 5/1995 | Tolbert et al. | |
| 5,825,303 A | * | 10/1998 | Bloss, Jr. et al. | 340/870.02 |
| 5,877,703 A | | 3/1999 | Bloss, Jr. et al. | |
| D422,886 S | * | 4/2000 | Shea | D8/354 |
| 6,072,405 A | * | 6/2000 | Sears | 340/870.02 |
| 6,109,576 A | * | 8/2000 | Szewczyk | 248/200 |
| 6,111,519 A | * | 8/2000 | Bloss, Jr. et al. | 340/870.02 |
| 6,177,883 B1 | * | 1/2001 | Jennetti et al. | 340/870.02 |
| 6,218,995 B1 | * | 4/2001 | Higgins et al. | 343/719 |

FOREIGN PATENT DOCUMENTS

| | | |
|---|---|---|
| GB | 2 326 002 A | 9/1998 |

* cited by examiner

*Primary Examiner*—Anita King
*Assistant Examiner*—Tan Le
(74) *Attorney, Agent, or Firm*—Quarles & Brady LLP

(57) ABSTRACT

A kit for variably positioning an antenna housing (20) and a transmitter housing (18) in a subsurface enclosure (10) with a utility meter (15) and a meter register (16) includes a bracket (30) which is rotatable with the antenna housing (20) to a selected position within 360° of rotation, and then secured with fasteners (39) to the stem (22) of the antenna housing (20). The kit also includes a spacer (23) which is held between the top flange (31) of the bracket (30) and an underside of the pit lid (13). The bracket (30) also has a depending flange (32) for mounting the transmitter assembly (18) in a suspended position from the antenna housing (20) in either a horizontal or vertical orientation to better utilize available space in the pit enclosure (10).

16 Claims, 2 Drawing Sheets

FIG. 1
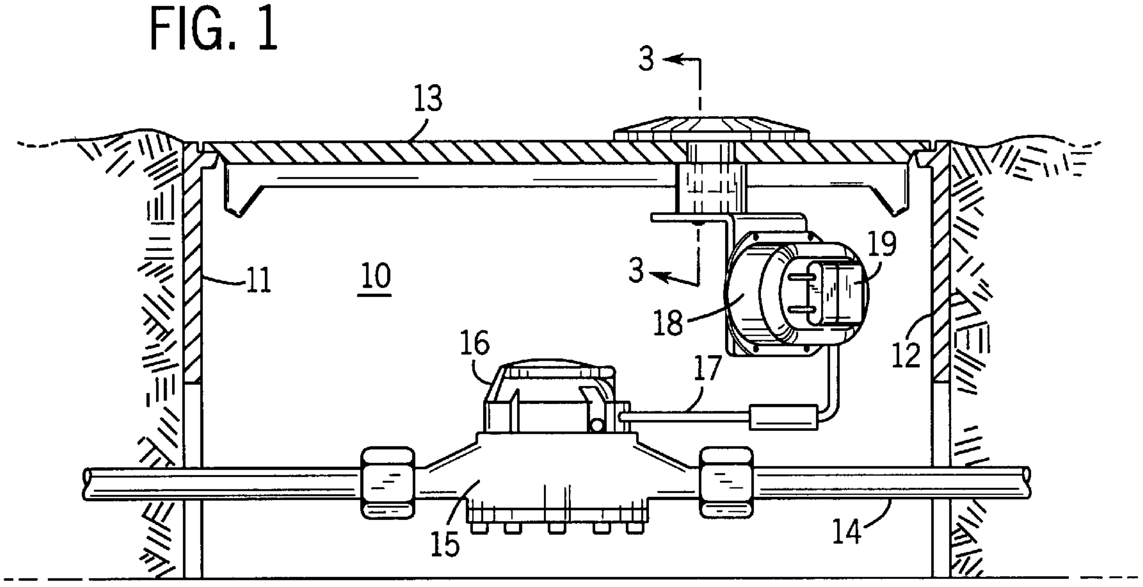
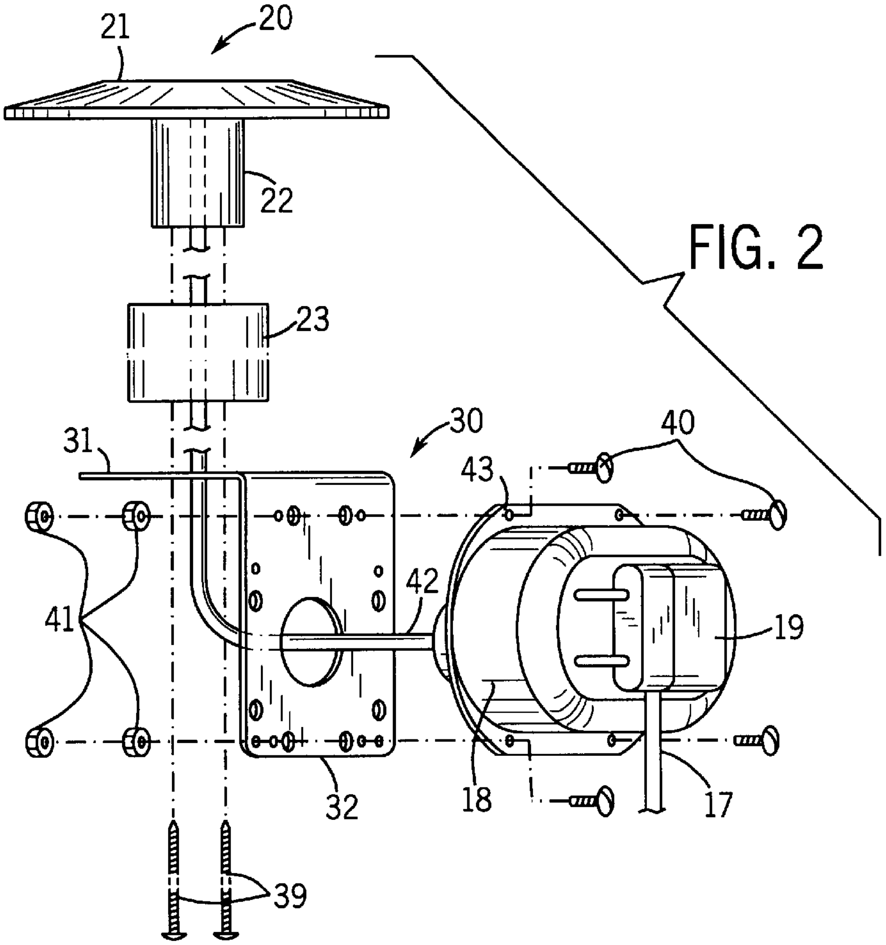
FIG. 2

FIG. 3
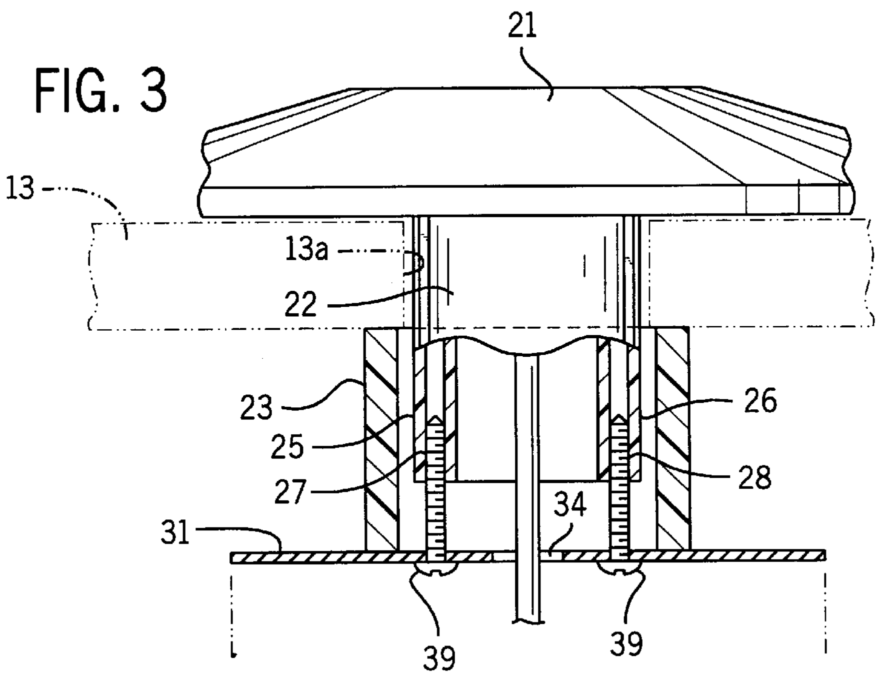
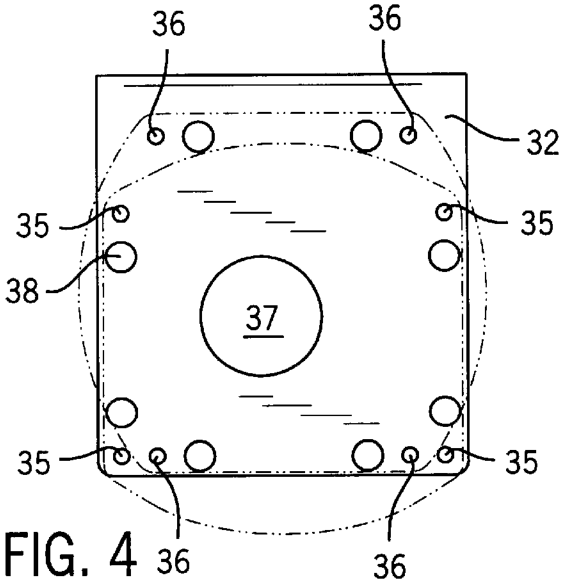
FIG. 4
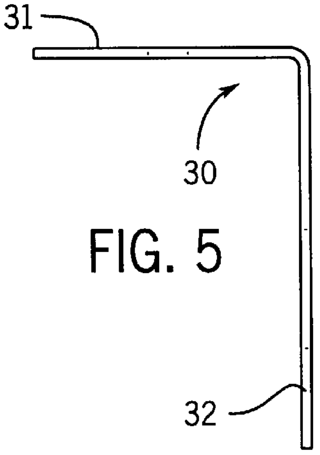
FIG. 5
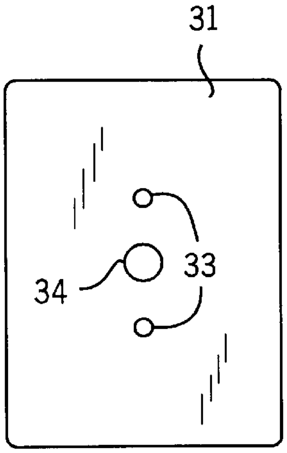
FIG. 6

KIT AND METHOD FOR MOUNTING A TRANSMITTER IN SUBSURFACE METER PITS

TECHNICAL FIELD

The invention relates to data transmitter assemblies for use with metering equipment in subsurface pit enclosures.

DESCRIPTION OF THE BACKGROUND ART

In moderate climate zones, utility meters are located in subsurface enclosures in areas adjacent to residences or other dwellings. Such enclosures are commonly referred to as "pits." An example of such an enclosure is illustrated in Cerny et al., U.S. Pat. No. 5,298,894.

As further disclosed in Cerny et al., a radio frequency (RF) transmitter may be situated in an assembly which is mounted or otherwise disposed in the pit enclosure. Such a radio frequency transmitter transmits signals representing meter consumption data to a mobile collection unit which may be carried in a vehicle or which may be carried by a person. Radio frequency transmitters may also be used to transmit signals from such a pit enclosure in a network with stationary collection units at predetermined locations.

It is desirable to make the assemblies which are located in meter pits compact in size, low in cost of manufacture, durable and easy to install and service.

A technical problem exists where the equipment must be installed in pre-existing pit enclosures which have been sized to accommodate a water meter, but the not the meter data transmitter and an antenna.

SUMMARY OF THE INVENTION

The invention provides a kit for variably positioning and mounting an antenna and a transmitter assembly in a confined space within a subsurface pit enclosure which also holds a utility meter and either a meter register or a pulse transmitter for transmitting an electrical pulse to an RF transmitter assembly.

The kit comprises, first, apparatus for releasably attaching an antenna housing to a pit lid, such that the antenna housing can be rotated to a selected position within 360° of rotation and then held against further rotation, and second, apparatus for mounting the transmitter assembly in a suspended position from the antenna housing in one of at least two different orientations.

The kit more particularly includes a bracket with a top flange and a spacer which fits between the top flange of the bracket and an underside of the pit lid. Two screws or other fasteners extend from the top flange into the stem of the antenna housing, such that the antenna housing can be rotated to a position within a 360° range of positions and then secured against further rotation.

The antenna assembly is rotatable before it is fastened down, to allow the bracket and the attached transmitter assembly to be moved away from the meter and meter register by rotating the transmitter assembly. The bracket also provides for suspending the transmitter assembly from the antenna housing. The bracket has a depending flange with sets of mounting holes for mounting a transmitter housing in at least two orientations. In a preferred embodiment, these orientations are a vertical orientation and a horizontal orientation.

Other objects and advantages of the invention, besides those discussed above, will be apparent to those of ordinary skill in the art from the description of the preferred embodiments which follow. In the description, reference is made to the accompanying drawings, which form a part hereof, and which illustrate examples of the invention. Such examples, however, are not exhaustive of the various embodiments of the invention, and therefore, reference is made to the claims which follow the description for determining the scope of the invention.

BRIEF DESCRIPTION OF THE DRAWINGS

FIG. 1 is side view in elevation of the present invention, in a pit enclosure shown in section;

FIG. 2 is an exploded perspective view of the embodiment of FIG. 1;

FIG. 3 is an enlarged detail view of a portion of FIG. 1 with parts broken away and in section;

FIG. 4 is front view in elevation of a bracket seen in FIG. 3;

FIG. 5 is a side view in elevation of the bracket of FIG. 4; and

FIG. 6 is a top plan view of the bracket of FIG. 4.

DETAILED DESCRIPTION OF THE PREFERRED EMBODIMENT

FIGS. 1 and 2 illustrates a subsurface enclosure 10, referred to as a "pit." The enclosure 10 is positioned below the surface of the ground and includes side walls 11, 12 and a lid 13 at ground level for closing the enclosure 10 from the top. A water line 14 runs through the enclosure 10 below ground level. A meter housing 15 containing a water metering element (not shown) is connected in the water line 14 inside the pit enclosure 10. The movements of the water metering element in response to flow are coupled to a register 16 which may provide either one or both of a visual display for displaying utility consumption data or a pulse transmitter for transmitting an electrical signal corresponding to utility consumption data. The signal is transmitted via a cable 17 to an RF transmitter enclosed within transmitter housing 18. The transmitter housing 18 includes a battery enclosure 19 disposed on its exposed back side. The cable 17 enters the transmitter housing 18 through the area between the transmitter housing 18 and the battery enclosure 19.

An antenna is enclosed in an antenna housing 20 including a cap 21 and a stem 22 made of a thermoplastic insulating material. The antenna and antenna housing 20 are shown and described in more detail in a copending application of Lazar et al., U.S. patent application Ser. No. 09/491,294, filed Jan. 25, 2000, and to the extent deemed necessary such disclosure is hereby incorporated by reference.

In use, the antenna assembly 20 has its stem 22 inserted in a hole 13*a* in a pit lid 13 (FIG. 3). An underside of the cap 21 rests on the pit lid 13. A spacer 23 is provided in the form of an annular collar member which encircles the stem 22 and provides spacing between a top flange 31 of a mounting bracket 30 and an underside of the pit lid 13. The generally circular cross section of the stem 22 is modified by the lateral extension of two projections 25, 26 on opposite sides of the stem 22 with holes 27, 28 at the bottom (FIG. 3) for mounting a bracket 30 using screws 39. The bracket 30 allows suspension of the transmitter housing 18 and battery housing 19 below the antenna housing 20.

The top flange 31 of the bracket 30 includes a central aperture 34 (FIG. 6) for allowing passage of a wire 42 from the transmitter 18 to the antenna housing 20. Two screw holes 33 (FIG. 6) are positioned on opposite sides of the central aperture 34 to receive the screws 39.

The depending flange 32 (FIG. 4) includes a central aperture 37 for allowing passage of the wire 42 (FIG. 2). There are two sets of four holes each, 35, 36 (FIG. 4), for mounting the transmitter housing in either a horizontal or vertical position, using fastening screws 40 (FIG. 2) which fit through a peripheral flange 43 of the transmitter housing 18 and which are secured with nuts 41. In addition, the depending flange 32 includes relief holes 38 for receiving heads of fasteners projecting from the back side of the transmitter housing 18.

The invention provides a kit for variably positioning and mounting the antenna housing 20 and the transmitter housing 18 in a confined space within the pit enclosure 10. The kit more particularly includes the bracket 30 with its top flange 31 and the spacer 23 which fits between the top flange 31 of the bracket 30 and an underside of the pit lid 13. Before fastening, the spacer 23 is placed around the stem 22 and is pressed against an underside of the pit lid 13 as the fasteners 39 are tightened. The kit also includes fasteners in the form of screws 39 or other fasteners, which extend from the top flange 31 into the stem 22 of the antenna housing 20, such that the antenna housing 20 can be rotated to a position within 360° and then secured against further rotation. The bracket 30 also provides for suspending the transmitter housing 18 from the antenna housing 20. The bracket 30 also includes the depending flange 31 with the two sets of mounting holes 35, 36 for mounting a transmitter housing 18 in at least two orientations. In an alternative equivalent embodiment, the transmitter housing 18 can be attached to a rotatable member carried by depending flange 32. In the preferred embodiment, the two orientations are a substantially vertical orientation and a substantially horizontal orientation, however other orientations at angles to horizontal and vertical could also be employed. By "substantially" it is meant that this orientation could vary by some small angle, such as ten degrees, from exactly horizontal or exactly vertical.

In the method of the present invention, the transmitter housing 20 is mounted with fasteners 40, 41 to the depending flange 32 of the bracket in one of at least two different orientations permitted by sets of holes 35, 36. This can be done either before or after the following action in which the antenna housing 20 is positioned on the pit lid and rotated to a selected position within 360° of rotation and then secured by tightening fasteners 39 extending through the upper flange 31 of the bracket 30 into stem 22.

The method allows the bracket 30 and the attached transmitter housing 18 to be moved away from the meter 15 and meter register 16 by rotating the transmitter housing 20 and bracket 30. The method and kit then allow the transmitter housing 18 to be variably positioned to avoid interference with the meter 15 and meter register 16.

This has been a description of the preferred embodiments of the method and apparatus of the present invention. Those of ordinary skill in this art will recognize that modifications might be made while still coming within the spirit and scope of the invention and, therefore, to define the embodiments of the invention, the following claims are made.

We claim:

1. A kit for mounting an antenna housing and a transmitter housing within a confined space within a subsurface enclosure in which a utility meter is disposed, the kit comprising:

means for releasably attaching the antenna housing to the pit lid, such that the antenna housing can be rotated to a selected position within 360° and then secured against further rotation; and first means for mounting the transmitter housing in suspended position from the antenna housing, wherein a rotational position of said first means for mounting is determined by positioning of the means for releasably attaching, said first means for mounting including second means for mounting the transmitter housing in a selected one of at least two different orientations in addition to said rotational position of said first means for mounting.

2. The kit of claim 1, wherein the means for releasably attaching the antenna housing to the pit lid further comprises a top flange of a bracket, a spacer for spacing the top flange of a bracket from an underside of a pit lid, and means for fastening the top flange of the bracket to a stem of the antenna housing, wherein the bracket is mounted in a fixed position relative to the antenna housing and is rotationally position ed according to the rotational positioning of the antenna housing.

3. The kit of claim 2, wherein the spacer is an annular collar member.

4. The kit of claim 1, wherein the first means for mounting the transmitter housing in suspended position from the antenna housing further comprises a depending flange, and wherein the depending flange has at least two sets of holes for mounting the transmitter housing in at least two different orientations.

5. The kit of claim 4, wherein the depending flange has a central aperture for allowing passage of a cable and additional apertures for receiving fastener heads projecting from the transmitter housing.

6. A kit for mounting an antenna housing and a transmitter housing within a confined space within a subsurface enclosure in which a utility meter is disposed, the kit comprising:

means for releasably attaching the antenna housing to the pit lid, such that the antenna housing can be rotated to a selected position within 360° and then secured against further rotation; and means for mounting the transmitter housing in suspended position from the antenna housing, said means for mounting including means for mounting the transmitter housing in at least two different orientations; and wherein the at least two different orientations for mounting the transmitter housing include a substantially horizontal orientation and a substantially vertical orientation.

7. A kit for mounting an antenna housing and mounting a transmitter housing within a subsurface pit enclosure having a pit lid enclosing a confined space that also contains a utility meter, the kit comprising:

a bracket having a top flange and a depending flange;

a spacer for positioning between an underside of the pit lid and the top flange of the bracket;

means for fastening the top flange of the bracket to a stem of the antenna housing to secure the antenna housing in a rotational position within 360° and to provide the depending flange for mounting of the transmitter housing; and means for fastening the transmitter housing to the depending flange of the bracket in a selected one of at least two orientations.

8. The kit of claim 7, wherein the spacer is an annular collar member.

9. The kit of claim 7, wherein the means for fastening the transmitter housing in at least two different orientations includes at least two sets of holes in the depending flange.

10. The kit of claim 7, wherein the depending flange has a central aperture for allowing passage of a cable and additional apertures for receiving projections projecting from the transmitter housing.

11. The kit of claim 7, wherein the at least two different orientations for mounting the transmitter housing include a substantially horizontal orientation and a substantially vertical orientation.

12. A method for mounting an antenna housing and a transmitter housing within a confined space within a subsurface enclosure in which a utility meter is disposed, the method comprising:

positioning the antenna housing on the pit lid, rotating the antenna housing to a selected position within 360° around an axis of rotation, and then securing the antenna housing to the pit lid and against further rotation; and attaching the transmitter housing in suspended position from the antenna housing, wherein a rotational position of transmitter housing is determined by positioning of the antenna housing; and positioning the transmitter housing in a selected one of at least two different orientations relative to an axis that is transverse to the axis of rotation.

13. The method of claim 12, wherein the attaching is accomplished before the securing of the antenna housing against further rotation relative to the pit lid.

14. The method of claim 12, wherein the attaching is accomplished after the securing of the antenna housing against further rotation relative to the pit lid.

15. The method of claim 12, wherein the two positions are a substantially horizontal position and a substantially vertical position.

16. A kit for mounting an antenna housing and mounting a transmitter housing within a subsurface pit enclosure having a pit lid enclosing a confined space that also contains a utility meter, the kit comprising:

a bracket having a top flange and a depending flange;

a spacer for positioning between an underside of the pit lid and the top flange of the bracket;

first fasteners for fastening the top flange of the bracket to a stem of the antenna housing to secure the antenna housing in a rotational position within 360° and to provide the depending flange for mounting of the transmitter housing; and second fasteners and receiving portions on the depending flange for fastening the transmitter housing to the depending flange of the bracket in a selected one of at least two orientations.

* * * * *